United States Patent
Jiang et al.

(10) Patent No.: US 11,001,711 B2
(45) Date of Patent: *May 11, 2021

(54) POLYAMIDE COMPOSITIONS

(71) Applicant: NUTRITION & BIOSCIENCES USA 4, INC., Rochester, NY (US)

(72) Inventors: Xian Jiang, Newark, DE (US); Shengmei Yuan, Newark, DE (US)

(73) Assignee: NUTRITION & BIOSCIENCES USA 4, INC., Rochester, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/462,994

(22) PCT Filed: Dec. 4, 2017

(86) PCT No.: PCT/US2017/064442
§ 371 (c)(1),
(2) Date: May 22, 2019

(87) PCT Pub. No.: WO2018/106574
PCT Pub. Date: Jun. 14, 2018

(65) Prior Publication Data
US 2019/0284394 A1    Sep. 19, 2019

Related U.S. Application Data

(60) Provisional application No. 62/429,901, filed on Dec. 5, 2016.

(51) Int. Cl.
*C08L 77/02* (2006.01)
*C08L 77/06* (2006.01)
*C08L 23/08* (2006.01)
*C08L 5/00* (2006.01)

(52) U.S. Cl.
CPC .............. *C08L 77/06* (2013.01); *C08L 77/02* (2013.01); *C08L 2205/03* (2013.01)

(58) Field of Classification Search
CPC ...... C08L 77/02; C08L 77/06; C08L 23/0869; C08L 5/00; C08L 2205/03
See application file for complete search history.

(56) References Cited

U.S. PATENT DOCUMENTS

| 3,264,272 A | 8/1966 | Rees et al. |
| 4,187,358 A | 2/1980 | Kyo et al. |
| 2005/0112247 A1* | 5/2005 | Stalberg ............. A22C 13/0013 426/135 |
| 2017/0362345 A1* | 12/2017 | Behabtu .................. C08L 23/04 |

FOREIGN PATENT DOCUMENTS

| WO | 2016106068 A1 | 6/2016 |
| WO | WO-2016-106068 A1 * | 6/2016 |

OTHER PUBLICATIONS

French, "Conformational Accessibility of Some Simple Polyglucosides", ACS Symp. Ser. 260, pp. 43-59 (1984).
PCT International Preliminary Report on Patentability; PCT/US2017/064442.

* cited by examiner

Primary Examiner — Karuna P Reddy

(57) ABSTRACT

Described herein are polyamide compositions comprising poly alpha-1,3-glucan in combination with a compatibilizer and processes for preparing such compositions. Such polyamide compositions exhibit improved elongation at break compared to polyamide compositions which lack a compatibilizer. These polyamide compositions exhibit an elongation at break of at least 9 percent when measured according to ASTM D638 after exposure to water at 120° C. at 2 atm pressure for 192 hours.

11 Claims, No Drawings

POLYAMIDE COMPOSITIONS

This application is the National Stage application of International Application No. PCT/US2017/064442 (filed Dec. 4, 2017), which claims the benefit of U.S. Provisional Application No. 62/429,901 (filed Dec. 5, 2016), both of which prior applications are incorporated herein by reference in their entirety.

OVERVIEW

Described herein are polyamide compositions comprising poly alpha-1,3-glucan in combination with a compatibilizer and processes for preparing such compositions. Also described herein are articles prepared from polyamide compositions comprising poly alpha-1,3-glucan and a compatibilizer.

Articles based on polyamides typically possess desirable chemical resistance, processability and heat resistance properties. This makes them particularly well suited for demanding high performance applications where temperatures higher than 150° C., even higher than 200° C., are often reached. When such articles are exposed to high temperatures for a prolonged period, especially in the presence of aqueous solutions, the mechanical properties generally tend to decrease due to hydrolysis of the polyamide. There is a general desire to improve the hydrolysis resistance of such articles.

Application No. WO 2016/106068 discloses compositions comprising alpha-1,3-glucan in combination with various polymers and several physical properties of such compositions.

DETAILED DESCRIPTION OF THE INVENTION

Abbreviations

The claims and description herein are to be interpreted using the abbreviations and definitions set forth below.
"%" refers to the term percent.
"wt %" refers to weight percent.
"hrs." refers to hours.
"atm" refers to atmosphere
"mm" refers to millimeters.
"min." refers to minutes.

Definitions

As used herein, the article "a" refers to one as well as more than one and does not necessarily limit its referent noun to the grammatical category of singular number.

As used herein, the term "article" refers to an item, thing, structure, object, element, device, etc. that is in a form, shape, configuration that is suitable for a particular use/purpose without further processing of the entire entity or a portion of it.

An article may comprise one or more element(s) or subassembly(ies) that either are partially finished and awaiting further processing or assembly with other elements/subassemblies that together will comprise a finished article. In addition, as used herein, the term "article" may refer to a system or configuration of articles.

The use of numerical values in the various ranges specified in this application, unless expressly indicated otherwise, are stated as approximations as though the minimum and maximum values within the stated ranges were both proceeded by the word "about". In this manner, slight variations above and below the stated ranges can be used to achieve substantially the same results as values within the ranges. Also, the disclosure of these ranges is intended as a continuous range including each and every value between the minimum and maximum values.

The terms "(meth)acrylic" and "(meth)acrylate" means acrylic and/or methacrylic and acrylate and/or methacrylate, respectively.

The term "salt of an ethylene/(meth)acrylic acid copolymer" means a copolymer comprising both ethylene and (meth)acrylic acid monomers wherein at least a portion of the carboxylic acid functional groups have been neutralized with one or more cations. Suitable cations can be one or more of a metal, an alkali metal, an alkaline earth metal, ammonia, a primary amine, a secondary amine, a tertiary amine or a combination thereof.

The term "initial elongation at break" refers to the elongation at break of a polyamide composition before exposure to water and is determined according to ASTM D638. In other words, initial elongation at break is determined at 0 hrs.

The terms "poly alpha-1,3-glucan", "alpha-1,3-glucan polymer" and "glucan polymer" are used interchangeably herein.

Ranges and Preferred Variants

Any range set forth herein expressly includes its endpoints unless explicitly stated otherwise. Setting forth an amount, concentration, or other value or parameter as a range specifically discloses all possible ranges formed from any possible upper range limit and any possible lower range limit, regardless of whether such pairs of upper and lower range limits are expressly disclosed herein. Compounds, processes and articles described herein are not limited to specific values disclosed in defining a range in the description.

The disclosure herein of any variation in terms of materials, chemical entities, methods, steps, values, and/or ranges, etc.—whether identified as preferred or not—of the processes, compounds and articles described herein specifically intends to include any possible combination of materials, methods, steps, values, ranges, etc. For the purpose of providing photographic and sufficient support for the claims, any disclosed combination is a preferred variant of the processes, compounds, and articles described herein.

In this description, if there are nomenclature errors or typographical errors regarding the chemical name any chemical species described herein, including curing agents of formula (I), the chemical structure takes precedence over the chemical name. And, if there are errors in the chemical structures of any chemical species described herein, the chemical structure of the chemical species that one of skill in the art understands the description to intend prevails.

Generally

Described herein are polyamide compositions comprising poly alpha-1,3-glucan in combination with a compatibilizer, articles prepared from said compositions, and processes for preparing such polyamide compositions. Such polyamide compositions have improved elongation properties compared to polyamide compositions which comprise poly alpha-1,3-glucan but which do not comprise a compatibilizer. Such polyamide compositions also exhibit improved hydrolysis resistance compared to polyamide compositions which do not comprise a compatibilizer.

Specifically, the polyamide compositions described herein comprise:

(a) from about 20 to about 99 wt. % of a polyamide, (b) from about 0.5 to about 40 wt. % poly alpha-1,3-glucan, and
(c) from about 0.5 to about 40 wt. % of a compatibilizer, and having an initial elongation at break of at least 5 percent when measured according to ASTM D638.

Additionally, the polyamide compositions described herein comprise:
(a) from about 20 to about 99 wt. % of a polyamide,
(b) from about 0.5 to about 40 wt. % poly alpha-1,3-glucan, and
(c) from about 0.5 to about 40 wt. % of a compatibilizer, and having an initial elongation at break of at least 5 percent when measured according to ASTM D638; and wherein the polyamide composition exhibits an elongation at break after 192 hours exposure to water at 120° C. at 2 atm pressure of at least 9 percent when measured according to ASTM D638.

Polyamide Composition

Polyamide

Polyamides which may be used to prepare the polyamide compositions described herein are not limited and may be any polyamide having a melting point below about 300° C. and above about 130° C. The polyamides are condensation products of one or more dicarboxylic acids and one or more diamines, and/or one or more aminocarboxylic acids, and/or ring opening polymerization products of one or more cyclic lactams. Suitable cyclic lactams are caprolactam and laurolactam. Polyamides may be fully aliphatic or semi-aromatic.

Fully aliphatic polyamides are formed from aliphatic and alicyclic monomers such as diamines, dicarboxylic acids, lactams, aminocarboxylic acids, and their reactive equivalents. A suitable aminocarboxylic acid is 11-aminododecanoic acid. Suitable lactams are caprolactam and laurolactam. In the context of this invention, the term "fully aliphatic polyamide" also refers to copolymers derived from two or more such monomers and blends of two or more fully aliphatic polyamides. Linear, branched, and cyclic monomers may be used. Carboxylic acid monomers comprised in the fully aliphatic polyamides include, but are not limited to aliphatic carboxylic acids, such as for example adipic acid (C6), pimelic acid (C7), suberic acid (C8), azelaic acid (C9), decanedioic acid (C10), dodecanedioic acid (C12), tridecanedioic acid (C13), tetradecanedioic acid (C14), pentadecanedioic acid (C15), hexadecanedioic acid (C16) and octadecanedioic acid (C18). Diamines can be chosen among diamines having four or more carbon atoms, including, but not limited to tetramethylene diamine, hexamethylene diamine, octamethylene diamine, decamethylene diamine, dodecamethylene diamine, 2-methylpentamethylene diamine, 2-ethyltetramethylene diamine, 2-methyloctamethylenediamine; trimethylhexamethylenediamine, meta-xylylene diamine, and/or mixtures thereof.

Semi-aromatic polyamides may be a homopolymer, a copolymer, a terpolymer and may be formed from monomers containing aromatic groups. One or more aromatic carboxylic acids may be terephthalic acid or a mixture of terephthalic acid with one or more other carboxylic acids, such as isophthalic acid, phthalic acid, 2-methyl terephthalic acid and naphthalic acid. In addition, the one or more aromatic carboxylic acids may be mixed with one or more aliphatic dicarboxylic acids, as disclosed above. Alternatively, an aromatic diamine such as meta-xylylene diamine (MXD) can be used to provide a semi-aromatic polyamide, an example of which is MXD6, a homopolymer comprising MXD and adipic acid.

Preferred polyamides disclosed herein include poly(hexamethylene terephthalamide/2-methylpentamethylene terephthalamide) (PA6T/DT); poly(hexamethylene hexanediamide) (PA66); poly(hexamethylene dodecanediamide) (PA612); poly(hexamethylene decanediamide) (PA610); poly(ε-caprolactam) (PA6); and blends of these.

The concentration of polyamide in the polyamide compositions described herein may range from 20 to 99 weight percent, preferably from 50 to 98 percent, and more preferably from 50 to 95 weight percent, and most preferably from 60 to 90 weight percent.

Poly Alpha-1,3-Glucan

Poly alpha-1,3-glucan is a polymer comprising glucose monomeric units linked together by glycosidic linkages, wherein at least about 50% of the glycosidic linkages are alpha-1,3-glycosidic linkages. Poly alpha-1,3-glucan is a type of polysaccharide. The 1,3-linkage of the poly alpha-1,3-glucan can be illustrated as follows:

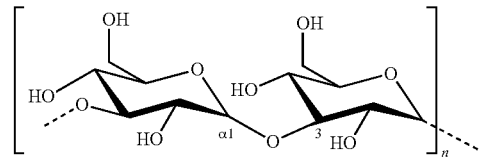

where n is an integer of at least 3.

The poly alpha-1,3-glucan in the polyamide compositions described herein is a solid having a particle size of from about 50 to 0.1 microns, preferably from 25 to 0.5 microns, and more preferably from 10 to 0.5 microns.

The concentration of poly alpha-1,3-glucan in the polyamide composition may range from about 0.5 to 40 weight percent, preferably from 1 to 30 weight percent, and more preferably from about 2 to 25 weight percent.

Depending on the end use application of the polyamide compositions described herein, one of skill in the art can easily choose the concentration of poly alpha-1,3-glucan in the polyamide composition necessary to obtain the desired elongation at break properties.

Compatibilizer

The compatibilizer used in the polyamide compositions described herein comprises a functional group selected from an anhydride group, an acid group, a metal salt of a carboxylic acid, an epoxy group, a vinyl acetate group, an acrylate group, or a combination of these.

Ethylene copolymers are an example of a compatibilizer wherein the functional groups are copolymerized into the polymer, for instance, a copolymer of ethylene and a (meth)acrylate monomer containing the appropriate functional group. Herein the term (meth)acrylate means the compound may be either an acrylate, a methacrylate, or a mixture of the two. Useful (meth)acrylate functional compounds include (meth)acrylic acid and glycidyl(meth)acrylate. In addition to ethylene and a functionalized (meth)acrylate monomer, other monomers may be copolymerized into such a polymer, such as vinyl acetate, unfunctionalized (meth)acrylate esters such as ethyl (meth)acrylate, n-butyl (meth)acrylate, i-butyl (meth)acrylate and cyclohexyl (meth)acrylate.

Suitable compatibilizers may also include ionomers. By an ionomer is meant a carboxyl group containing polymer that has been neutralized or partially neutralized with metal cations such as zinc, magnesium, and manganese. Examples of ionomers are described in U.S. Pat. Nos. 3,264,272 and 4,187,358, both incorporated by reference herein. Examples of suitable carboxyl group containing polymers include, but are not limited to, ethylene/acrylic acid copolymers and ethylene/methacrylic acid copolymers. The carboxyl group containing polymers may also be derived from one or more additional monomers, such as, but not limited to, butyl acrylate. Ionomers are commercially available under the Surlyn® trademark from E.I. du Pont de Nemours and Co., Wilmington, Del.

The compatibilizer may preferably be based on an ethylene/α-olefin copolymer. Diene monomers such as 1,4-hexadiene or dicyclopentadiene may optionally be used in the preparation of the copolymer such as ethylene-propylenediene (EPDM) polymers. The carboxyl moiety may be introduced during the preparation of the polyolefin by copolymerizing with an unsaturated carboxyl-containing monomer. A preferred compatibilizer is an ethylene/α-olefin copolymer grafted with 0.3 to 5 wt % maleic anhydride. The α-olefin is preferably selected from butane, hexane, and octane. Blends of copolymers comprising functional groups may also be used as compatibilizers. Examples of ethylene/α-olefin copolymers which have been grafted with maleic anhydride include those commercial copolymers under the PARALOID™ brand from Dow Chemical, Midland Mich.

Herein the term ethylene copolymers include ethylene terpolymers and ethylene multi-polymers, i.e. having greater than three different repeat units. Ethylene copolymers useful as compatibilizers described herein include those selected from the group consisting of ethylene copolymers of the formula E/X/Y wherein:

E is the radical formed from ethylene;

X is selected from the group consisting of radicals formed from

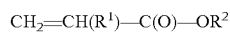

$CH_2=CH(R^1)-C(O)-OR^2$ wherein $R^1$ is H, $CH_3$ or $C_2H_5$, and $R^2$ is an alkyl group having 1-8 carbon atoms; vinyl acetate; and mixtures thereof; wherein X comprises 0 to 50 weight % of E/X/Y copolymer;

Y is one or more radicals formed from monomers selected from the group consisting of carbon monoxide, sulfur dioxide, acrylonitrile, maleic anhydride, maleic acid diesters, (meth)acrylic acid, maleic acid, maleic acid monoesters, itaconic acid, fumaric acid, fumaric acid monoesters and potassium, sodium and zinc salts of said preceding acids, glycidyl (meth)acrylate, 2-hydroxyethyl (meth)acrylate, 2-isocyanatoethyl (meth)acrylate and glycidyl vinyl ether; wherein Y is from 0.5 to 35 weight % of the E/X/Y copolymer, and preferably 0.5-20 weight percent of the E/X/Y copolymer, and E is the remainder weight percent and preferably comprises 40-90 weight percent of the E/X/Y copolymer.

It is preferred that the compatibilizer contain a minimum of about 0.5, more preferably 1.0, very preferably about 2 weight percent of repeat units and/or grafted molecules containing functional groups, and a maximum of about 15, more preferably about 13, and very preferably about 10 weight percent of monomers containing functional groups. It is to be understood than any preferred minimum amount may be combined with any preferred maximum amount to form a preferred range. There may be more than one type of functional monomer present in the compatibilizer, and/or more than one compatibilizer. In one embodiment the compatibilizer comprises about 2.5 to about 10 weight percent of repeat units and/or grafted molecules containing functional groups or carboxylate salts (including the metal).

The concentration of compatibilizer in the polyamide compositions described herein may range from about 0.5 to 40 weight percent, preferably from 0.5 to 30 weight percent, and more preferably from about 1 to 30 weight percent.

When the concentration of glucan in the polyamide composition is about 5 weight percent or less, the initial elongation at break values may be less than 5 percent depending on the concentration of compatibilizer in the polyamide composition. Initial (0 hrs.) elongation at break values may be improved in such situations by modifying the concentration ratio of poly alpha-1,3-glucan to compatibilizer (poly alpha-1,3-glucan:compatibilizer). Preferably, the poly alpha-1,3-glucan:compatibilizer ratio should be about 1:0.75, preferably 1:1, and more preferably at least 1:1.5 when the concentration of poly alpha-1,3-glucan in the polyamide composition is about 5 weight percent or less.

Additives

The polyamide composition can further comprise one or more additives, wherein the additives are pigments, surfactants, fillers, stabilizers, UV absorbers, dispersants, flame retardants, antimicrobial agents, plasticizers or a combination thereof.

Preparing Polyamide Compounds Described Herein

The polyamide composition may be prepared using various methods known to one skilled in the art. For example, the polyamide composition may be blended in solution, followed by the removal of at least a portion of the solvent. The step of removing at least a portion of the solvent can be performed at ambient temperature, at ambient pressure, at reduced pressure, at elevated temperature or at a combination of reduced pressure and elevated temperature. The solvent can also be removed using a spray drying process.

The polyamide composition may also be formed by melt blending, in which all ingredients and any optional additives are adequately mixed or dispersed in a polyamide matrix. Any melt-blending method may be used for mixing the ingredients and any optional additives into the polyamide resin. For example, all ingredients may be fed into a melt mixer, such as single screw extruder or twin screw extruder, agitator, single screw or twin screw kneader, or Banbury mixer. All the ingredients may be added at once or gradual addition in batches. When the ingredients are gradually added in batches, a part of the ingredients is first added, and then is melt-mixed with the remaining ingredients that are subsequently added, until an adequately mixed composition is obtained.

The polyamide compositions exhibit improved hydrolysis resistance and elongation at break properties compared to identical polyamide compositions but which lack a compatibilizer.

The polyamide compositions disclosed herein, when exposed to water at 120° C. at 2 atm pressure for 192 hours, exhibit an elongation at break of at least 9 percent, and preferably at least 11 percent when measured according to ASTM D638.

Test Methods

Tensile properties, including tensile strength (TS), elongation at break (EB) and tensile modulus (TM) of thermoplastic polymer compositions were measured per ASTM D638 specification at 23° C. with Type I bars using an Instron Universal tester model 4202 at a crosshead speed of 50.8 mm/min (2 inches/min. Averages of five test samples are listed in the Table 1.

Examples

The disclosure is further defined in the following Examples. It should be understood that these Examples, while indicating certain preferred aspects of the disclosure, are given by way of illustration only. From the above discussion and these Examples, one skilled in the art can ascertain the essential characteristics of this disclosure, and without departing from the spirit and scope thereof, can make various changes and modifications to adapt it to various uses and conditions.

The exemplary articles are identified by "E" in the tables below are intended only to further illuminate and not to limit the scope of compounds, processes, and articles described and recited herein. Comparative examples are identified in the tables below by "C".

Materials

In the compounds, processes, and articles exemplified in the tables below, the following materials were used. All percents are by weight unless indicated otherwise.

Polyamide A—A polyamide 612 available as Zytel® 151 from DuPont Glucan—Poly alpha-1,3-glucan Compatibilizer—An ethylene α-olefin copolymer grafted with 1.8 wt % maleic anhydride available from E.I. DuPont de Nemours and Company, Wilmington, Del., USA as TRX301E.

Process for Making Polyamide Compositions

Polyamide, poly alpha-1,3-glucan, and if present compatibilizer, are compounded together using a twin-screw extruder. The mixture is then injection molded into ASTM D638 Type I tensile bars. The molded tensile bars were tested for mechanical properties and the results shown in Tables 1 and 2.

TABLE 1

|  | C1 | C2 | C3 | C4 | E1 | E2 |
|---|---|---|---|---|---|---|
| Ingredient | | | | | | |
| Polyamide | 100 | 95 | 90 | 80 | 92.5 | 85 |
| Glucan | 0 | 5 | 10 | 20 | 5 | 10 |
| Compatibilizer | 0 | 0 | 0 | 0 | 2.5 | 5 |
| Physical Properties | | | | | | |
| EB 0 hrs. (%) | 17 | 2.2 | 2.0 | 2.0 | 2.4 | 11.3 |
| EB 192 hrs. | 2.3 | 11.1 | 12.3 | 7.9 | 14.9 | 14.9 |
| TS 0 hrs. (MPa) | 55.8 | 49.5 | 46.5 | 46.5 | 49.1 | 49.3 |
| TS 192 hrs. | 22.0 | 42.9 | 43.0 | 36.4 | 44.2 | 39.5 |
| TM 0 hrs. (MPa) | 2516 | 2641 | 2690 | 2814 | 2593 | 2505 |
| TM 192 hrs. | 1282 | 1286 | 1283 | 1260 | 1248 | 1158 |

TABLE 2

|  | C5 | E3 | E4 | E5 | E6 | E7 | E8 | E9 |
|---|---|---|---|---|---|---|---|---|
| Ingredient | | | | | | | | |
| Polyamide | 70 | 70 | 55 | 85 | 70 | 55 | 90 | 80 |
| Glucan | 30 | 20 | 30 | 5 | 10 | 15 | 5 | 10 |
| Compatibilizer | 0 | 10 | 15 | 10 | 20 | 30 | 5 | 10 |
| Physical Properties | | | | | | | | |
| EB 0 hrs. (%) | 1.8 | 5.12 | 8.0 | 14.5 | 20.8 | 32.1 | 15.02 | 9.51 |
| EB 192 hrs. | 3.17 | 9.63 | 11.99 | 17.36 | 29.17 | 44.78 | 15.31 | 15.88 |
| TS 0 hrs. (MPa) | 47.2 | 44.9 | 35.1 | 46.6 | 34.4 | 24.2 | 57.1 | 47.6 |
| TS 192 hrs. | 23.2 | 28.8 | 24.3 | 37.4 | 27.1 | 19.0 | 42.1 | 32.8 |
| TM 0 hrs. (MPa) | 2516 | 2331 | 1914 | 2234 | 1623 | 1195 | 2688 | 2272 |
| TS 192 hrs. | 1214 | 948 | 698 | 1040 | 699 | 457 | 1233 | 1023 |

Tables 1 and 2 show that polyamide compositions comprising both poly alpha-1,3-glucan and a compatibilizer exhibit an elongation at break after exposure to water for 192 hrs. at 120° C. and 2 atm pressure of at least 9 percent (E3) as shown by examples E2 to E9. Tables 1 and 2 also show the addition of a compatibilizer to a polyamide/poly alpha-1,3-glucan mixture can improve the initial (0 hrs.) elongation at break to as much as 32 percent (Example E7).

Example E1 shows that when the concentration of poly alpha-1,3-glucan in the polyamide composition is about 5 weight percent or less, the desired initial elongation at break values may be less than 5 percent if the concentration of compatibilizer is too low. E1 has a concentration of poly alpha-1,3-glucan of 5 weight percent and a concentration of compatibilizer of 2.5 weight percent and exhibits an elongation at break of only 2.4 percent. E8 shows that when the concentration of poly alpha-1,3-glucan in the polyamide composition is 5 weight percent, a concentration ratio of poly alpha-1,3-glucan to compatibilizer (poly alpha-1,3-glucan:compatibilizer) of 1:1 provides an initial elongation at break of at least 5 percent.

What is claimed is:

1. A polyamide composition comprising:
   (a) about 20 to about 99 weight percent of a polyamide,
   (b) about 0.5 to about 40 weight percent of poly alpha-1,3-glucan, and
   (c) about 0.5 to about 40 weight percent of a compatibilizer,
   wherein said polyamide composition has an initial elongation at break of at least 5 percent when measured according to ASTM D638, and
   wherein the compatibilizer is a maleic anhydride-grafted ethylene/α-olefin copolymer, maleic anhydride-grafted ethylene-propylene-diene polymer, or a combination thereof.

2. The polyamide composition of claim 1, wherein the polyamide is poly(hexamethylene terephthalamide/2-methylpentamethylene terephthalamide), poly(hexamethylene hexanediamide), poly(hexamethylene decanediamide), poly(ε-caprolactam), or a combination thereof.

3. The polyamide composition of claim 1, wherein the compatibilizer is the maleic anhydride-grafted ethylene/α-olefin copolymer.

4. An article prepared from the polyamide composition of claim 1.

5. The polyamide composition of claim 1, wherein said polyamide composition exhibits an elongation at break after 192 hours exposure to water at 120° C. at 2 atm pressure of at least 9 percent when measured according to ASTM D638.

6. The polyamide composition of claim 1, wherein the polyamide is poly(hexamethylene dodecanediamide).

7. The polyamide composition of claim 6, wherein the compatibilizer is the maleic anhydride-grafted ethylene/α-olefin copolymer.

8. An article prepared from the polyamide composition of claim 7.

9. The polyamide composition of claim 1, wherein the polyamide composition comprises 5 weight percent or less of the poly alpha-1,3-glucan, and the concentration ratio of the poly alpha-1,3-glucan to the compatibilizer is about 1:0.75.

10. The polyamide composition of claim 1, wherein the polyamide composition comprises 5 weight percent or less of the poly alpha-1,3-glucan, and the concentration ratio of the poly alpha-1,3-glucan to the compatibilizer is about 1:1.

11. The polyamide composition of claim 1, wherein the polyamide composition comprises 5 weight percent or less of the poly alpha-1,3-glucan, and the concentration ratio of the poly alpha-1,3-glucan to the compatibilizer is at least about 1:1.5.

* * * * *